(12) United States Patent
Sen et al.

(10) Patent No.: US 12,639,351 B1
(45) Date of Patent: May 26, 2026

(54) INDUCING TABLE OF CONTENTS KNOWLEDGE IN A MODEL-BASED INFORMATION RETRIEVER

(71) Applicant: INTERNATIONAL BUSINESS MACHINES CORPORATION, Armonk, NY (US)

(72) Inventors: Jaydeep Sen, Bangalore (IN); Vineet Kumar, New Delhi (IN); Sachindra Joshi, Gurgaon (IN); Vishwajeet Kumar, Bangalore (IN); Riyaz Bhat, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/009,208

(22) Filed: Jan. 3, 2025

(51) Int. Cl.
*G06F 16/00* (2019.01)
*G06F 16/334* (2025.01)
*G06F 16/951* (2019.01)

(52) U.S. Cl.
CPC .......... *G06F 16/334* (2019.01); *G06F 16/951* (2019.01)

(58) Field of Classification Search
CPC .............................. G06F 16/334; G06F 16/951
USPC ........................................................ 707/705
See application file for complete search history.

(56) References Cited

U.S. PATENT DOCUMENTS

| | | | |
|---|---|---|---|
| 2003/0130994 A1 | 7/2003 | Singh et al. | |
| 2008/0086457 A1* | 4/2008 | Fei ........................ | G06F 16/951 |
| 2024/0233427 A1* | 7/2024 | Singaraju .............. | G06F 40/242 |

FOREIGN PATENT DOCUMENTS

WO        2011/097066 A2      8/2011

OTHER PUBLICATIONS

"Knowledge Navigator: LLM-guided Browsing Framework for Exploratory Search in Scientific Literature"; By: Uri Katz; Published Aug. 2024 https://arxiv.org/pdf/2408.15836 (Year: 2024).*
Chen et al., "Understanding Differential Search Index for Text Retrieval", Findings of the Association for Computational Linguistics: ACL 2023, Jul. 9-14, 2023, 17 pages.
Katz et al., "Knowledge Navigator: LLM-guided Browsing Framework for Exploratory Search in Scientific Literature" arXiv:2408.15836v1, Aug. 28, 2024, 18 pages.
Zhuang et al., "Bridging the Gap Between Indexing and Retrieval for Differentiable Search Index with Query Generation", arXiv:2206.10128v3, Jul. 7, 2023, 11 pages.

* cited by examiner

*Primary Examiner* — Chelcie L Daye
(74) *Attorney, Agent, or Firm* — Harrity & Harrity, LLP

(57)                ABSTRACT

An approach is provided for inducing table of contents (TOC) knowledge in a model-based information retrieval (IR) system. A TOC searcher in a model-based IR system is trained by fine tuning a large language model (LLM) to learn about a plurality of TOC entries specifying structures of documents and how to select from the plurality of TOC entries to respond to a query. The most granular TOC entries for a given document are identified. The given document is marked with leaf node markers which indicate the identified TOC entries. A user query is received and analyzed. By using the leaf node markers and the LLM, a TOC entry included in the identified TOC entries is identified as specifying a portion of the given document that includes an answer to the analyzed user query.

20 Claims, 5 Drawing Sheets

100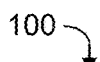

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

CODE FOR INDUCING TABLE OF CONTENTS KNOWLEDGE IN A MODEL-BASED INFORMATION RETRIEVAL (IR) SYSTEM 200

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
| VIRTUAL MACHINE SET 143 | CONTAINER SET 144 |

*FIG. 1*

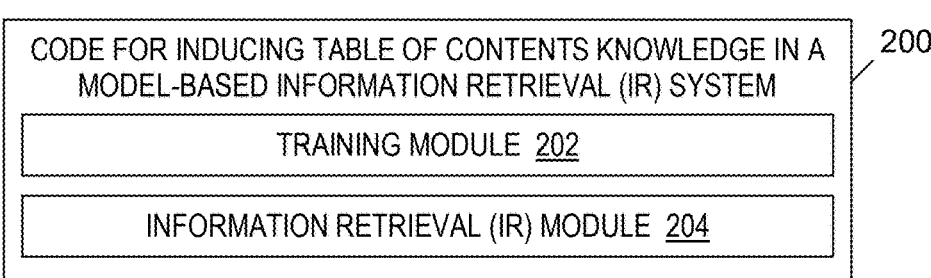

CODE FOR INDUCING TABLE OF CONTENTS KNOWLEDGE IN A MODEL-BASED INFORMATION RETRIEVAL (IR) SYSTEM — 200

TRAINING MODULE  202

INFORMATION RETRIEVAL (IR) MODULE  204

*FIG. 2*

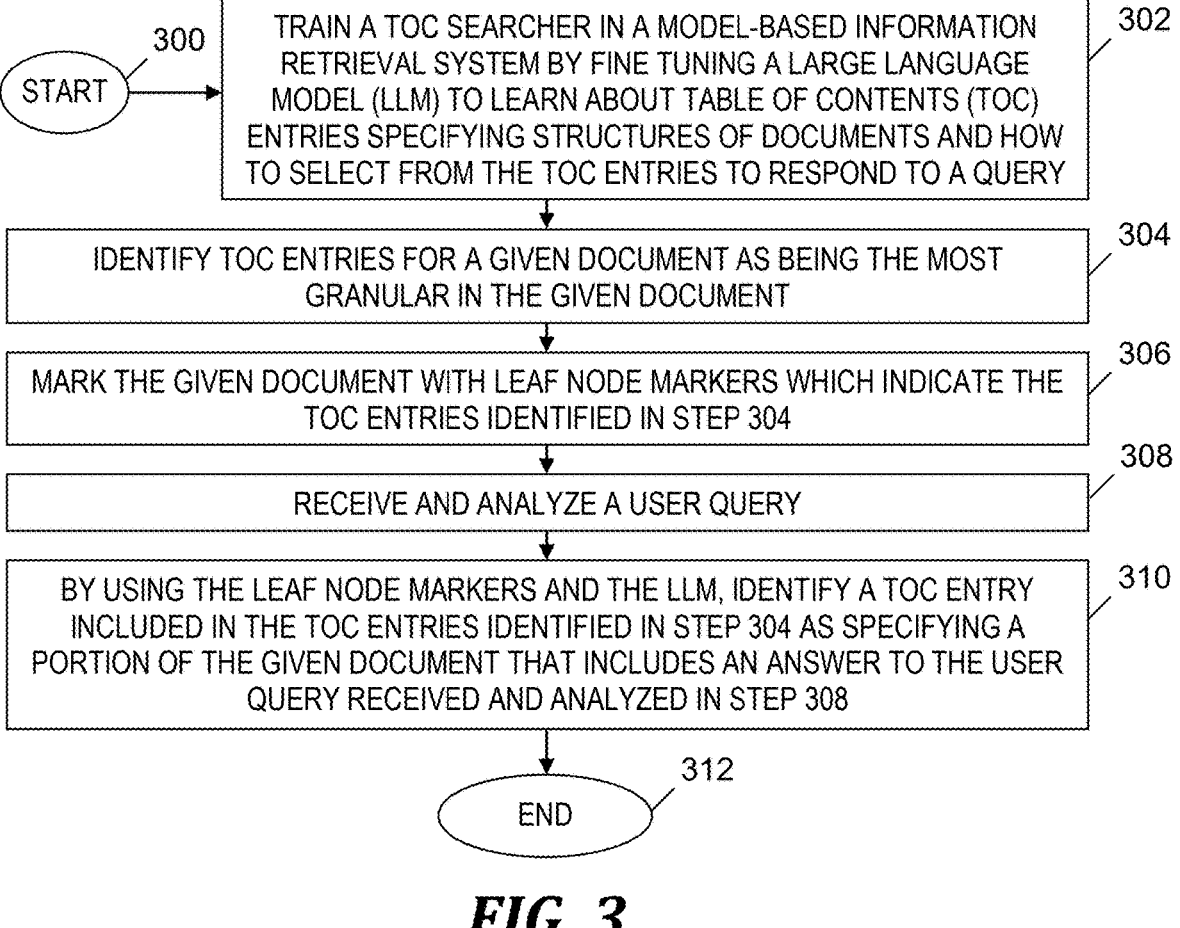

START — 300

TRAIN A TOC SEARCHER IN A MODEL-BASED INFORMATION RETRIEVAL SYSTEM BY FINE TUNING A LARGE LANGUAGE MODEL (LLM) TO LEARN ABOUT TABLE OF CONTENTS (TOC) ENTRIES SPECIFYING STRUCTURES OF DOCUMENTS AND HOW TO SELECT FROM THE TOC ENTRIES TO RESPOND TO A QUERY — 302

IDENTIFY TOC ENTRIES FOR A GIVEN DOCUMENT AS BEING THE MOST GRANULAR IN THE GIVEN DOCUMENT — 304

MARK THE GIVEN DOCUMENT WITH LEAF NODE MARKERS WHICH INDICATE THE TOC ENTRIES IDENTIFIED IN STEP 304 — 306

RECEIVE AND ANALYZE A USER QUERY — 308

BY USING THE LEAF NODE MARKERS AND THE LLM, IDENTIFY A TOC ENTRY INCLUDED IN THE TOC ENTRIES IDENTIFIED IN STEP 304 AS SPECIFYING A PORTION OF THE GIVEN DOCUMENT THAT INCLUDES AN ANSWER TO THE USER QUERY RECEIVED AND ANALYZED IN STEP 308 — 310

END — 312

Instruction: You are given a Table of Contents for the book "Action Research". All leaf subsections begin with a "(leaf)"

Table of Contents:
(leaf) 1. What is Action Research for Classroom Teachers?
(leaf) 2. Action Research as a Process for Professional Learning and Leadership
(leaf) 3. Planning Your Research: Reviewing the Literature and Developing Questions
(leaf) 4. Preparing for Action Research in the Classroom: Practical Issues
(leaf) 5. Collecting Data in Your Classroom
(leaf) 6. Analyzing Data from Your Classroom
(leaf) 7. Let it Be Known! Sharing your Results
(leaf) 8. The Action Research Process from a High School ELA Teacher's Perspective

Prompt: Which leaf subsection can best answer the user query below? Generate only the name of the subsection. Do not generate any explanation.

Query: What is the first step in the data analysis process of an action research project?

Output: Best leaf subsection that can answer the user query: (leaf) 6. Analyzing Data from Your Classroom</s>

| Domain | #TOC leaves | Mistral Out of Box | BM25 | Model Based Indexer (DSI) | Fine-tuned DPR | TOC Searcher |
|---|---|---|---|---|---|---|
| Education | 8 | 0.334 | 0.638 | 0.737 | 0.428 | 0.792 |
| Finance | 99 | 0.199 | 0.599 | 0.632 | 0.418 | 0.731 |
| Law | 47 | 0.212 | 0.771 | 0.707 | 0.444 | 0.844 |
| Medicine | 121 | 0.39 | 0.706 | 0.739 | 0.516 | 0.852 |
| Nat. Sci. | 34 | 0.461 | 0.741 | 0.813 | 0.609 | 0.832 |
| Soc. Sci. | 117 | 0.234 | 0.53 | 0.411 | 0.525 | 0.649 |
| Avg | 71 | 0.305 | 0.664 | 0.673 | 0.489 | 0.783 |

FIG. 8

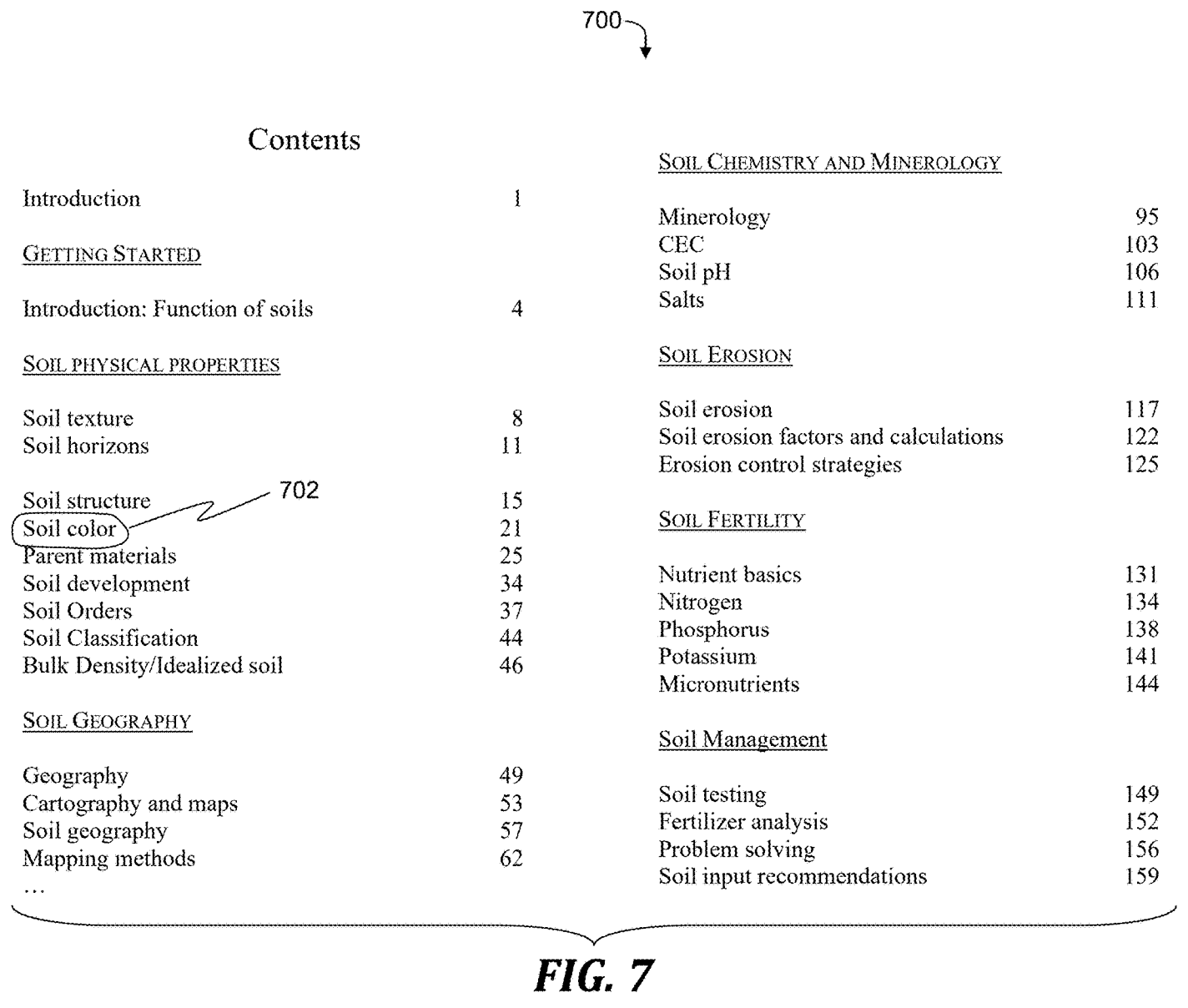

Contents

700

Introduction    1

GETTING STARTED

Introduction: Function of soils    4

SOIL PHYSICAL PROPERTIES

Soil texture    8
Soil horizons    11

Soil structure    15
Soil color    702    21
Parent materials    25
Soil development    34
Soil Orders    37
Soil Classification    44
Bulk Density/Idealized soil    46

SOIL GEOGRAPHY

Geography    49
Cartography and maps    53
Soil geography    57
Mapping methods    62
...

SOIL CHEMISTRY AND MINEROLOGY

Minerology    95
CEC    103
Soil pH    106
Salts    111

SOIL EROSION

Soil erosion    117
Soil erosion factors and calculations    122
Erosion control strategies    125

SOIL FERTILITY

Nutrient basics    131
Nitrogen    134
Phosphorus    138
Potassium    141
Micronutrients    144

Soil Management

Soil testing    149
Fertilizer analysis    152
Problem solving    156
Soil input recommendations    159

*FIG. 7*

INDUCING TABLE OF CONTENTS KNOWLEDGE IN A MODEL-BASED INFORMATION RETRIEVER

BACKGROUND

The present invention relates to information retrieval, and more particularly to model-based information retrieval.

SUMMARY

In one embodiment, the present invention provides a computer-implemented method. The method includes training a TOC searcher in a model-based information retrieval (IR) system by fine tuning a large language model (LLM) to learn about a plurality of table of contents (TOC) entries specifying structures of documents and how to select from the plurality of TOC entries to respond to a query. The method further includes identifying, by the trained TOC searcher, TOC entries for a given document as having a granularity that exceeds a granularity of any other TOC entry for the given document. The method further includes marking, by the trained TOC searcher, the given document with leaf node markers which indicate the identified TOC entries. The method further includes receiving and analyzing a user query. The method further includes identifying, by using the leaf node markers and the LLM, a TOC entry which is included in the identified TOC entries and which specifies a portion of the given document that includes an answer to the analyzed user query.

A computer system and a computer program product corresponding to the above-summarized computer-implemented method are also described herein.

BRIEF DESCRIPTION OF THE DRAWINGS

FIG. 1 is a block diagram of a system for inducing table of contents knowledge in a model-based IR system, in accordance with embodiments of the present invention.

FIG. 2 is a block diagram of modules included in code included in the system of FIG. 1, in accordance with embodiments of the present invention.

FIG. 3 is a flowchart of a process of inducing table of contents knowledge in a model-based IR system, where operations of the flowchart are performed by modules in FIG. 2, in accordance with embodiments of the present invention.

FIG. 6 is an example of an instance of training the table of contents searcher included in the system of FIG. 4, in accordance with embodiments of the present invention.

FIG. 7 is an example of a table of contents used in the process of FIG. 3 and included in the system of FIG. 4, in accordance with embodiments of the present invention.

FIG. 8 is an example of recall scores comparing results of the table of contents searcher included in the system of FIG. 4 against conventional information retrieval techniques, in accordance with embodiments of the present invention.

DETAILED DESCRIPTION

Overview

Figures 4, 5:
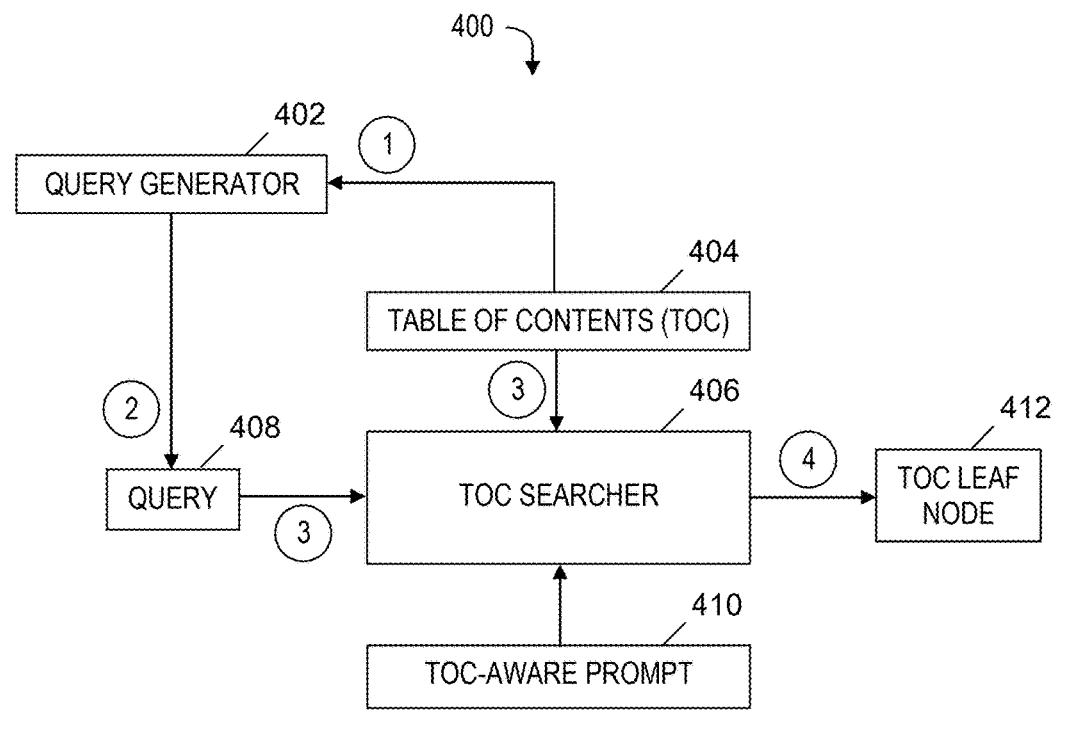
FIG. 4 is a block diagram of a system that implements steps in the process of FIG. 3, in accordance with embodiments of the present invention.
FIG. 5 is a block diagram of a system for training the table of contents searcher included in the system of FIG. 4, in accordance with embodiments of the present invention.

Conventional information retrieval (IR) approaches include (i) sparse retrievers (e.g., Best Match 25 (BM25))

that use an inverted index over keywords from textual content and (ii) dense retrievers (e.g., dense passage retrieval (DPR) and contextualized late interaction over BERT (Col-BERT)) that use embeddings from textual content for semantic search. BERT is an abbreviation for bidirectional encoder representations from transformers.

Conventional model-based IR systems (e.g., differentiable search index (DSI)) use parametric knowledge for index management and an easy-to-deploy architecture. Known retrieval augmented generation (RAG) applications retrieve information while lacking fine-grained retrieval of precise text chunks within a document. Given a question, a conventional model-based IR system outputs a document identifier, but lacks guidance to infer a precise segment of the document for answering the given question. Furthermore, conventional model-based IR systems employ non-optimal strategies for determining what to index and how to index in documents because the conventional systems are restricted to using retrieval units that are chunks, which are extrinsic to native elements of the documents and whose length strictly depends on token length, while ignoring the informative hierarchical structure that is inherent in some documents. A model-based IR system is also referred to herein as a model-based information retriever.

Embodiments of the present invention address the aforementioned unique challenges by employing a table of contents (TOC) searcher system that receives a user query and TOC entries (i.e., section headings and/or sub-section headings included in a TOC of a document) as input, and selects a particular TOC entry as an output for the user query, thereby using a document structure or a document hierarchy as guidance to determine a precise segment of the document that answers the user query. In one embodiment, the document structure (or document hierarchy) is a natural structure of the document, which means that the structure is existing in the document at the time the document is authored. As used herein, a table of contents (also referred to herein as a TOC) is defined as a hierarchical structure used to organize content of a long document or a book. The hierarchical structure includes different levels of granularity (e.g., chapters, sections, and sub-sections) and can be indicated by textual information included in the document or book or by digital information (e.g., bookmarks in a Portable Document Format (PDF) document). The document structure as a TOC is common in enterprise technical reports, books, and product documentation. The TOC searcher system is also referred to herein as simply the TOC searcher. In one embodiment, the TOC searcher is included in a model-based IR system (e.g., DSI system).

In one embodiment, a TOC searcher selects a TOC entry as output for the user query, where the answer to the query is included in a long document, such as a book, and a natural structure (e.g., TOC) is available for the document. In another embodiment, the structure of the document is not existing within the document at the time the document is authored, but the TOC searcher constructs a TOC or another hierarchical structure for the document which summarizes sections (or sections and sub-sections) of the document, where the sections (or sections and sub-sections) are delineated by the layout and/or meaning of the text in the document.

Embodiments of the present invention provide a training approach for the TOC searcher that learns to select a TOC entry (i.e., a leaf node) as output that indicates a portion of a document that includes an answer to a user query.

In one embodiment, the TOC searcher provides a section or subsection heading in a TOC as a retrieval unit which is a complete, yet self-contained information block, thereby providing a finer granular retrieval of more precise text chunks within documents as compared to conventional retrieval approaches.

In one embodiment, the TOC searcher uses document structure as an auxiliary input together with a question and generates a segment identifier for fine-grained retrieval of information.

In one embodiment, a menu-based training regime is provided over a sequence-to-sequence architecture used by a model-based IR system, where the sequence-to-sequence architecture learns to constrain its output to a segment identifier, which is necessarily among the possible options given to the model during inference time.

In one embodiment, a model-based IR system is provided with knowledge of the content layout of documents and predicts precise document segments as being sections that include or are most likely to include a correct answer to a given user query.

Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer-readable storage media (also called "mediums") collectively included in a set of one, or more, storage devices, and that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a system for inducing table of contents knowledge in a model-based IR system, in accordance with embodiments of the present invention. Computing environment 100 contains an example of an environment for the execution of at least some of the computer code involved in performing the inventive methods, such as code 200 for inducing TOC knowledge in a model-based IR system. The aforementioned computer code is also referred to herein as computer-readable code, computer-readable program code, and machine readable code. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size).

Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

System and Process for Inducing Table of Contents Knowledge in a Model-Based Information Retrieval System FIG. 2 is a block diagram of modules included in code included in the system of FIG. 1, in accordance with embodiments of the present invention. Code 200 includes a training module 202 and an information retrieval (IR) module 204.

Training module 202 is configured to train a TOC searcher in a model-based IR system by fine tuning a LLM to learn about TOC entries that specify hierarchical structures of documents and to also learn how to select a TOC entry from the TOC entries, where the selected TOC entry specifies a portion of a given document that includes or is most likely to include text content that answers a generated query.

Training module 202 is further configured to use an input of <generated query, TOC> to train the TOC searcher to generate a correct TOC leaf node. As used herein, a TOC leaf node is a TOC entry that is marked with a leaf node marker (e.g., marked with "(leaf)" so that "(leaf)" precedes the TOC entry). A correct TOC leaf node means that the TOC leaf node specifies the portion of a given document that includes or is most likely to include text content that answers a generated query.

In one embodiment, training module 202 is configured to use a LLM with a TOC-aware prompt which instructs the LLM to select the TOC leaf node that specifies or is most likely to specify the portion of a given document that includes the answer to a query. The LLM learns the specific knowledge captured in the given document and further learns the new task of given a query and a TOC, selecting the TOC leaf node that specifies or is most likely to specify the portion of the given document that answers the query.

In one embodiment, training module 202 employs an iterative question generation (QG) process for training a LLM and random testing of the LLM. The aforementioned iterative process includes (i) generating training data by sampling the most granular sections in a given document and generating multiple queries from the text in a sampled most granular section; (ii) random test generation that includes randomly sampling any chapter (or other TOC entry), generate questions from the sampled chapter, and testing the trained LLM on the generated questions and determine whether the results of the testing are satisfactory or unsatisfactory; and (iii) iterative training by repeating the training data generation and random test generation with additional generated questions if the results of the testing are unsatisfactory. Otherwise, if the testing results are satisfactory, then training module 202 stops training and performs a step of development set (dev set) based checkpoint selection in a validation phase of the LLM.

Training module 202 is further configured to mark the TOC with leaf node markers and prompt the LLM to constrain generation of output by the LLM so that the output includes only TOC entries that have been marked with leaf node markers (e.g., the output is constrained to include a TOC entry that immediately follows a leaf node marker).

IR module 204 is configured to (i) receive an analyze an user query; and (ii) identify a TOC entry included in the TOC of a given document as the TOC entry that specifies a portion of the given document that includes or is likely to include an answer to the user query.

The functionality of the modules included in code 200 is described in more detail in the discussions presented below relative to FIG. 3, FIG. 4, FIG. 5, FIG. 6, FIG. 7, and FIG. 8.

FIG. 3 is a flowchart of a process of inducing table of contents knowledge in a model-based IR system, where operations of the flowchart are performed by modules in FIG. 2, in accordance with embodiments of the present invention. The process of FIG. 3 begins at a start node 300. In step 302, training module 202 trains a TOC searcher in a model-based IR system by fine tuning a LLM to learn about TOC entries specifying structures of documents and how to select from the TOC entries to respond to queries.

In step 304, training module 202 identifies TOC entries for a given document as being the most granular in the given document (i.e., the identified TOC entries have a granularity that exceeds a granularity of any other TOC entry for the given document).

In step 306, training module 202 marks the given document with leaf node markers which respectively indicate the TOC entries identified in step 304. In one embodiment, training module 202 inserts a leaf node marker (e.g., the marker "(leaf)") immediately before the TOC entry being marked by the leaf node marker.

In one embodiment, steps 304 and 306 are performed by the model-based IR system whose TOC searcher is trained in step 302.

In step 308, IR module 204 receives and analyzes a user query.

In step 310, by using the leaf node markers used in step 306 and the fine-tuned LLM, IR module 204 identifies a TOC entry included in the TOC entries identified in step 304 as the TOC entry that specifies a portion of the given document that includes or is likely to include an answer to the user query received and analyzed in step 308.

After step 310, the process of FIG. 3 ends at an end node 312.

In one embodiment, step 302 includes (i) inputting a plurality of TOCs to the LLM as respective hierarchical tree representations using numbers, where the plurality of TOCs include the aforementioned TOC entries, and (ii) marking leaf nodes in the plurality of TOCs, where training the LLM includes learning how to select one of the marked leaf nodes to indicate a selected TOC entry for a given TOC by using one of the hierarchical tree representations which is associated with the given TOC, where selecting one of the leaf nodes to indicate the selected TOC entry is based on the leaf node being marked.

In one embodiment, step 306 includes inserting the leaf node markers in the given document so that the leaf node markers are prefixes to the identified TOC entries, respectively, and step 310 includes identifying the TOC entry based in part on the TOC entry being located after a corresponding leaf node marker in the marked given document.

In one embodiment, step 310 includes using multiple beams-based decoding to identify multiple TOC entries included in the identified TOC entries, where the multiple TOC entries are the TOC entries that specify or are most likely to specify the portion of the given document that includes a correct answer to the user query. The aforementioned step of identifying multiple TOC entries is further performed by using the leaf node markers and the LLM.

In one embodiment, subsequent to step 310, the model-based IR system (i) presents content specified by the identified TOC entry to an end user as including a correct answer to the user query; (ii) in response to presenting the content, receives an indication from the end user that the presented content does not include the correct answer to the user query; (iii) based on the indication that the presented content does not include the correct answer, employs a continuing conversation between the model-based IR system and a computing system utilized by the end user to collect additional information from the end user about the correct answer; and (iv) based on the additional information and by using the leaf node markers and the LLM, identifies another TOC entry included in the identified TOC entries as specifying the portion of the given document that includes a correct answer to the user query.

In one embodiment, the identification of the TOC entry in step 310 is a result of a process of iterative decoding that includes a series of selections of TOC entries, where a given selection in the series, which is subsequent to a prior selection, is a selection of a TOC query which is beneath the prior selection in a hierarchy specified by the TOC.

FIG. 4 is a block diagram of a system 400 that implements steps in the process of FIG. 3, in accordance with embodiments of the present invention. System 400 includes a query generator 402, a TOC 404, a TOC searcher 406, a query 408, a TOC-aware prompt 410, and a TOC leaf node 412. In one embodiment, TOC searcher 406 is included in a model-based IR system, which includes system 400 and other components that are not shown in FIG. 4.

System 400 receives text content and TOC 404 included in a given document (e.g., a book). Query generator 402 generates queries for the content to build TOC searcher 406, where the queries are questions a user would ask. System 400 trains TOC searcher 406 by fine-tuning a LLM (not shown) included in TOC searcher 406. System 400 uses <generated query, TOC> to train TOC searcher 406 to generate the correct TOC leaf node (e.g., TOC leaf node 412) that specifies the portion of the given document that includes or is most likely to include a correct answer to the generated query (e.g., query 408). System 400 uses a LLM (not shown) along with TOC-aware prompt 410 to instruct TOC searcher 406 to select the TOC leaf node 412, which specifies the portion of the given document that includes or is most likely to include a correct answer to the generated query. The LLM learns the specific knowledge included in the given document. The LLM also learns a new task: given query 408 and TOC 404, TOC searcher 406 selects the TOC leaf node as being the TOC leaf node that includes or is most likely to include a correct answer to query 408.

TOC searcher 406 receives as input the TOC 404 and query 408 generated by query generator 402. TOC searcher 406 marks the most granular TOC entries in TOC 404 with leaf node markers, thereby marking the most granular TOC entries as TOC leaf nodes. For example, TOC searcher 406 inserts a prefix to each TOC entry in TOC 404 to create the TOC leaf nodes. TOC searcher 406 receives TOC-aware prompt 410, which instructs TOC searcher 406 to constrain the generation of output to only TOC entries that have been marked as TOC leaf nodes.

Steps 1 through 4 are indicated in FIG. 4 by the numbers 1-4 within respective circles. In step 1, query generator 402 receives TOC entries from TOC 404 and generates queries for the content, where the queries are questions a user would ask and are used to build TOC searcher 406. In step 2, query generator 402 generates query 408 and sends query 408 to TOC searcher 406. In one part of step 3, TOC searcher 406 receives query 408. In another part of step 3, TOC searcher 406 receives TOC 404. TOC searcher 406 also receives TOC-aware prompt 410 as described above. In step 4, using TOC 404, TOC searcher 406 generates TOC leaf node 412 as output to the processing of query 408, where TOC leaf node 412 specifies a portion of the given document that includes or is likely to include a correct answer to query 408.

FIG. 5 is a block diagram of a system 500 for training TOC searcher 406 in FIG. 4, in accordance with embodiments of the present invention. System 500 includes a train data generation module 502, a model 504, a random test generation and evaluation module 506, and a development set based checkpoint selection module 508. System 500 implements an iterative question generation (QG) process for training data generation and random test generation and evaluation. In one embodiment, model 504 is a LLM.

Steps that employ modules in system 500 are shown as the numbers 1 through 3 within respective circles in FIG. 5. In step 1 during a training phase that trains TOC searcher 406, train data generation module 502 samples the most granular sections included in a given document and generates multiple queries from the text in each of the sampled most granular sections. The most granular sections have a granularity that is not exceeded by the granularity of any other section in the given document.

In step 2 following the aforementioned training phase, random test generation and evaluation module 506 (i) randomly samples any chapter(s) (or other section(s) specified by one of the aforementioned most granular sections) of the given document, (ii) generates questions based on content in the randomly sampled chapter(s) by using model 504, where the generated questions were not used in the training phase, and (iii) uses the generated questions to test TOC searcher 406. In one or more embodiments, the aforementioned random sampling is performed by a hardware random number generator or a software-based pseudorandom number generator.

A result of testing the TOC searcher 406 for generated questions is either a satisfactory result or an unsatisfactory result. A satisfactory result identifies granular sections from the most granular sections that correctly answer the generated questions with a recall score that exceeds a threshold score. An unsatisfactory result identifies the granular sections that correctly answer the generated questions with a recall score that does not exceed the threshold score.

If the result of testing the TOC searcher 406 is unsatisfactory, then in step 3 in FIG. 5, system 500 performs an iterative training step by repeating the generation of training data by train data generation module 502 and the testing by random test generation and evaluation module 506 (i.e., repeating steps 1 and 2 in FIG. 5). If the result of testing the TOC searcher 406 is satisfactory, then development set based checkpoint selection module 508 stops the training and selects a checkpoint based on recall numbers for a retrieval task on a development set.

EXAMPLES

FIG. 6 is an example 600 of an instance of training TOC searcher 406 in FIG. 4, in accordance with embodiments of the present invention. The training instance in example 600 includes an instruction to TOC searcher 406 that TOC 404 is for the book "Action Research" and indicates that the leaf subsections (i.e., TOC leaf nodes) in TOC 404 are marked with the leaf node marker "(leaf)." The training instance further includes the text of TOC 404 along with the leaf node markers, the user query (i.e., "Which is the first step in the data analysis process of an action research project?"), and the prompt for the LLM to generate an output that includes only the name of the leaf subsection that includes content that includes or is most likely to include a correct answer to the user query (as compared to the content specified by the other leaf subsections). Furthermore, the training instance includes the output generated by the LLM, where the output is the leaf subsection named "(leaf) 6. Analyzing Data from Your Classroom" which is the leaf subsection most likely to include a correct answer to the user query.

FIG. 7 is an example 700 of a table of contents used in the process of FIG. 3 and included in the system of FIG. 4, in accordance with embodiments of the present invention. TOC searcher 406 receives a user query "How does soil become red?" TOC searcher uses leaf node markers (not shown in FIG. 7) and the LLM (not shown in FIG. 7) to identify the TOC entry 702 (i.e., "Soil color") as being the TOC entry that specifies a portion of a document that includes a correct answer to the user query.

FIG. 8 is a table 800 of recall@1 scores comparing recall results of the TOC searcher 406 in FIG. 4 against conventional IR techniques, in accordance with embodiments of the present invention. Table 800 includes recall scores for TOC searcher 406 and for conventional information retrieval systems for different books in six different domains (i.e., Education, Finance, Law, Medicine, Natural Sciences, and Social Sciences in the column labeled "Domain"). The column labeled "#TOC leaves" in table 800 includes the number of TOC leaf nodes included in the TOCs in the books in the aforementioned domains. The third through sixth columns in table 800 include recall scores for a LLM out-of-the-box system without performing any fine-tuning (i.e., the column labeled "Mistral Out of Box"), an information retrieval system employing the BM25 (Best Match 25) ranking function (i.e., the column labeled "BM25"), a conventional DSI-based system that does not use any TOC or other structure included in the documents (i.e., the column labeled "Model Based Indexer (DSI)), and a dense passage retrieval (DPR) system which is fine-tuned (i.e., the column labeled "Fine-tuned DPR"). The final column in table 800 includes recall scores for output generated by TOC searcher 406 (i.e., the column labeled "TOC searcher"). The recall scores for TOC searcher in table 800 are higher than the recall scores in table 800 for the conventional IR techniques for all domains in table 800; therefore, the performance of TOC searcher 406 is better than the performance of the conventional IR techniques in table 800.

TOC-aware training used in the system disclosed herein is inherently designed as a multi-task training for two correlated tasks: (i) corpus learning which includes ingesting the content of the book or corpus; and (ii) task learning using the TOC for generation, which includes learning to select only a TOC leaf node given the TOC.

Inferences from the superior performance of TOC searcher 406 in table 800 include: (1) regarding the inferior performance of Mistral Out of Box, prompting LLMs out-of-the-box cannot seamlessly use the TOC without task-specific learning; and (2) regarding the inferior performance of Fine-tuned DPR and Model Based Indexer, it is not possible to bypass the training needed to perform TOC-aware generation by corpus training alone.

The descriptions of the various embodiments of the present invention have been presented herein for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
training a table of contents (TOC) searcher in a model-based information retrieval system by fine tuning a large language model (LLM) to learn about a plurality of TOC entries specifying structures of documents and how to select from the plurality of TOC entries to respond to a query, wherein training the TOC searcher includes training the LLM including learning how to select a leaf node to indicate a selected TOC entry for a given TOC by using an inputted hierarchical tree representation associated with the given TOC and based on leaf nodes associated with the given TOC being marked;
identifying, by the trained TOC searcher, TOC entries for a given document as having a granularity that exceeds a granularity of any other TOC entry for the given document;
marking, by the trained TOC searcher, the given document with leaf node markers which indicate the identified TOC entries;
receiving and analyzing a user query;
identifying, by using the leaf node markers and the LLM, a TOC entry included in the identified TOC entries that specifies a portion of the given document that includes, or is most likely to include, an answer to the analyzed user query; and
outputting content specified by the identified TOC entry as including the answer to the analyzed user query.

2. The method of claim 1, wherein the training the TOC searcher includes:
during a training phase, training the LLM by sampling granular sections of a document and generating multiple queries from text in each sampled granular section, each sampled granular section having a granularity that is not exceeded by a granularity of any other granular section of the document.

3. The method of claim 2, wherein the training the TOC searcher further includes:

inputting a plurality of TOCs to the LLM as respective hierarchical tree representations using numbers, wherein the plurality of TOCs include the plurality of TOC entries; and
marking leaf nodes in the plurality of TOCs.

4. The method of claim 1, further comprising:
identifying, by using the leaf node markers and the LLM, multiple TOC entries included in the identified TOC entries that most likely specify the portion of the given document that includes the answer to the analyzed user query by using multiple beams-based decoding.

5. The method of claim 1, further comprising:
in response to the outputting the content, receiving an indication from an end user that the content is not a correct answer to the analyzed user query;
based on the indication that the content is not the correct answer, employing a continuing conversation between the model-based information retrieval system and the end user to collect additional information from the end user; and
based on the additional information and by using the leaf node markers and the LLM, identifying another TOC entry included in the identified TOC entries.

6. The method of claim 1, wherein the identifying the TOC entry is a result of a process of iterative decoding that includes a series of selections of TOC entries, wherein a given selection in the series subsequent to a prior selection is a selection of a TOC entry beneath the prior selection in a hierarchy of TOC.

7. The method of claim 1, wherein the marking the given document includes inserting the leaf node markers in the given document so that the leaf node markers are prefixes to the identified TOC entries, respectively, and wherein the identifying the TOC entry is based in part on the TOC entry being located after a corresponding leaf node marker in the marked given document.

8. A computer system comprising:
a processor set;
one or more computer-readable storage media; and
program instructions stored on the one or more computer-readable storage media to cause the processor set to perform operations comprising:
training a table of contents (TOC) searcher in a model-based information retrieval system by fine tuning a large language model (LLM) to learn about a plurality of TOC entries specifying structures of documents and how to select from the plurality of TOC entries to respond to a query, wherein the training the TOC searcher includes training the LLM including learning how to select a leaf node to indicate a selected TOC entry for a given TOC by using an inputted hierarchical tree representation associated with the given TOC and based on leaf nodes associated with the given TOC being marked;
identifying, by the trained TOC searcher, TOC entries for a given document as having a granularity that exceeds a granularity of any other TOC entry for the given document;
marking, by the trained TOC searcher, the given document with leaf node markers which indicate the identified TOC entries;
receiving and analyzing a user query;
identifying, by using the leaf node markers and the LLM, a TOC entry included in the identified TOC entries that specifies a portion of the given document that includes, or is most likely to include, an answer to the analyzed user query; and

outputting content specified by the identified TOC entry as including the answer to the analyzed user query.

9. The computer system of claim 8, wherein the training the TOC searcher includes:

during a training phase, training the LLM by sampling granular sections of a document and generating multiple queries from text in each sampled granular section, each sampled granular section having a granularity that is not exceeded by a granularity of any other granular section of the document.

10. The computer system of claim 9, wherein the training the TOC searcher further includes:

inputting the plurality of TOCs to the LLM as respective hierarchical tree representations using numbers, wherein the plurality of TOCs include the plurality of TOC entries; and marking leaf nodes in the plurality of TOCs.

11. The computer system of claim 8, wherein the operations further comprise:

identifying, by using the leaf node markers and the LLM, multiple TOC entries included in the identified TOC entries that most likely specify the portion of the given document that includes the answer to the analyzed user query by using multiple beams-based decoding.

12. The computer system of claim 8, wherein the operations further comprise:

in response to the outputting the content, receiving an indication from an end user that the content is not a correct answer to the analyzed user query;

based on the indication that the content is not the correct answer, employing a continuing conversation between the model-based information retrieval system and the end user to collect additional information from the end user; and based on the additional information and by using the leaf node markers and the LLM, identifying another TOC entry included in the identified TOC entries.

13. The computer system of claim 8, wherein the identifying the TOC entry is a result of a process of iterative decoding that includes a series of selections of TOC entries, wherein a given selection in the series subsequent to a prior selection is a selection of a TOC entry beneath the prior selection in a hierarchy of TOC.

14. The computer system of claim 8, wherein the marking the given document includes inserting the leaf node markers in the given document so that the leaf node markers are prefixes to the identified TOC entries, respectively, and wherein the identifying the TOC entry is based in part on the TOC entry being located after a corresponding leaf node marker in the marked given document.

15. A computer program product comprising:

one or more computer-readable storage media; and program instructions stored on the one or more computer-readable storage media to perform operations comprising:

training a table of contents (TOC) searcher in a model-based information retrieval system by fine tuning a large language model (LLM) to learn about a plurality of TOC entries specifying structures of documents and how to select from the plurality of TOC entries to respond to a query, wherein the training the TOC searcher includes training the LLM including learning how to select a leaf node to indicate a selected TOC entry for a given TOC by using an inputted hierarchical tree representation associated with the given TOC and based on leaf nodes associated with the given TOC being marked;

identifying, by the trained TOC searcher, TOC entries for a given document as having a granularity that exceeds a granularity of any other TOC entry for the given document;

marking, by the trained TOC searcher, the given document with leaf node markers which indicate the identified TOC entries;

receiving and analyzing a user query;

identifying, by using the leaf node markers and the LLM, a TOC entry included in the identified TOC entries that specifies a portion of the given document that includes, or is most likely to include, an answer to the analyzed user query; and outputting content specified by the identified TOC entry as including the answer to the analyzed user query.

16. The computer program product of claim 15, wherein the training the TOC searcher includes:

during a training phase, training the LLM by sampling granular sections of a document and generating multiple queries from text in each sampled granular section, each sampled granular section having a granularity that is not exceeded by a granularity of any other granular section of the document.

17. The computer program product of claim 16, wherein the training the TOC searcher further includes:

inputting the plurality of TOCs to the LLM as respective hierarchical tree representations using numbers, wherein the plurality of TOCs include the plurality of TOC entries; and marking leaf nodes in the plurality of TOCs.

18. The computer program product of claim 15, wherein the operations further comprise:

identifying, by using the leaf node markers and the LLM, multiple TOC entries included in the identified TOC entries that most likely specify the portion of the given document that includes the answer to the analyzed user query by using multiple beams-based decoding.

19. The computer program product of claim 15, wherein the operations further comprise:

in response to the outputting the content, receiving an indication from an end user that the content is not a correct answer to the analyzed user query;

based on the indication that the content is not the correct answer, employing a continuing conversation between the model-based information retrieval system and the end user to collect additional information from the end user; and based on the additional information and by using the leaf node markers and the LLM, identifying another TOC entry included in the identified TOC entries.

20. The computer program product of claim 15, wherein the identifying the TOC entry is a result of a process of iterative decoding that includes a series of selections of TOC entries, wherein a given selection in the series subsequent to a prior selection is a selection of a TOC entry beneath the prior selection in a hierarchy of TOC.

* * * * *